Oct. 4, 1949.  O. E. WOLFF  2,483,389
FILM-HOLDER FOR SELF-DEVELOPING CAMERAS
Filed Jan. 10, 1948  2 Sheets-Sheet 1

Otto E. Wolff
INVENTOR

BY Donald P. Brown
and
Albert P. Davis
Attorneys

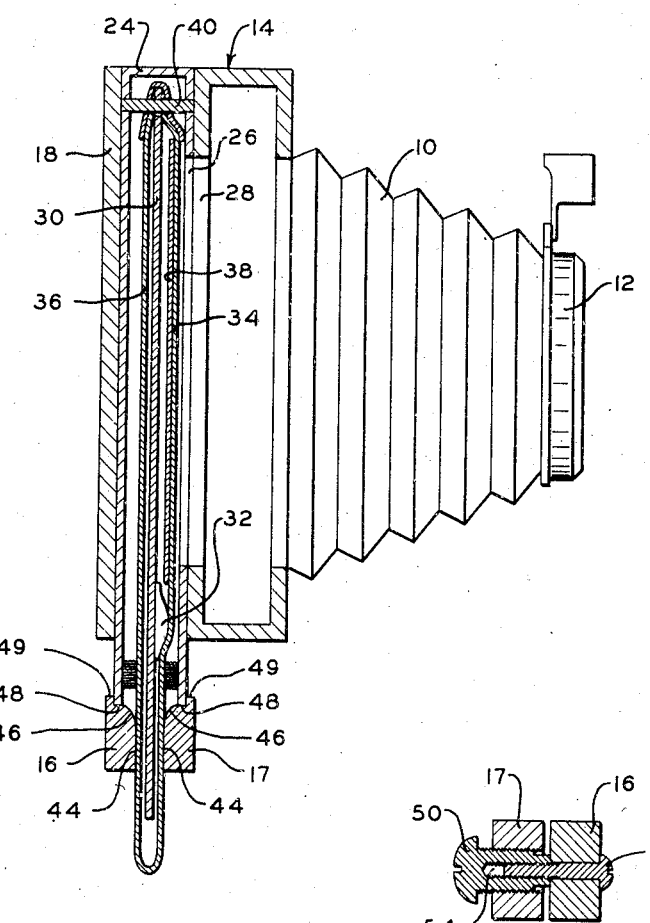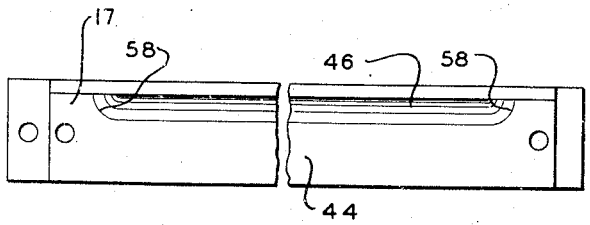

Patented Oct. 4, 1949

2,483,389

UNITED STATES PATENT OFFICE 2,483,389

FILM-HOLDER FOR SELF-DEVELOPING CAMERAS

Otto E. Wolff, Cambridge, Mass., assignor to Polaroid Corporation, Cambridge, Mass., a corporation of Delaware Application January 10, 1948, Serial No. 1,539

17 Claims. (Cl. 95—13)

This invention relates to photographic apparatus for exposing a layer of photosensitive material to record thereon an image of an object and for processing said photosensitive layer, wherein a liquid is spread in a layer of predetermined thickness between two sheets of flexible material, one of which is said photosensitive material.

One object of the present invention is to provide a photographic apparatus for exposing a layer of photosensitive material to actinic light and processing the photosensitive material thus exposed by spreading a liquid photographic reagent, or solvent for a photographic reagent, in a layer of predetermined uniform thickness between said exposed photosensitive material and another surface.

Another object of the present invention is to provide a photographic apparatus for exposing a layer of photosensitive material to actinic light and having means located exteriorly of the means for exposing the photosensitive material for spreading a liquid photographic reagent, or a solvent for a photographic reagent, in a layer of predetermined uniform thickness between said exposed photosensitive material and another surface.

A further object of the present invention is to provide a photographic apparatus for spreading a liquid photographic reagent, or solvent for a photographic reagent, in a layer of predetermined uniform thickness having substantially parallel marginal edges between an exposed photosensitive surface and another surface, wherein the speed with which the liquid is spread and/or the viscosity of said liquid does not affect the thickness of the layer of liquid to any appreciable degree.

Another object of the present invention is to provide a photographic apparatus for spreading a liquid photographic reagent, or solvent for a photographic reagent, in a layer of predetermined uniform thickness having substantially parallel marginal edges between a photosensitive layer comprising one surface of a sheet of deformable material and the surface of a second sheet of deformable material, wherein variations in the thickness of the layers of sheet material cause only minor variations in the thickness of the layer of liquid.

A further object of the present invention is to provide a photographic apparatus comprising a slot having a fixed predetermined width and a predetermined edge configuration adapted to spread a liquid photographic reagent or solvent for a photographic reagent in a layer of predetermined uniform thickness having substantially parallel marginal edges between a photosensitive layer comprising one surface of a sheet of deformable material and a surface of a second sheet of deformable material wherein said sheets of material are drawn through said slot to spread a layer of liquid thinner than the difference between the width of said slot and the total thickness of said sheet materials.

A further object of the present invention, is to provide a photographic apparatus for carrying out the process wherein a liquid composition containing a photographic reagent, or solvent for a photographic reagent, is spread in a layer of predetermined uniform thickness having substantially parallel marginal edges between a layer of photosensitive material having a latent negative image formed therein and a second layer of material adapted to receive a visible positive image of said latent image wherein the speed with which said liquid is spread and/or the viscosity of the liquid does not affect the thickness of the layer of liquid to any appreciable degree and wherein variations in the thickness of either of the sheet materials cause only minor variations in the thickness of the layer of liquid.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein:

Fig. 2 is a diagrammatic, sectional view of the photographic apparatus of the present invention showing a composite photographic film unit in position in said photographic apparatus;

Fig. 3 is a sectional view of the liquid-spreading means of the present invention taken along the line 3—3 of Fig. 1; and Fig. 4 is a plan view of one element of the liquid-spreading means of the present invention.

Figure 1:
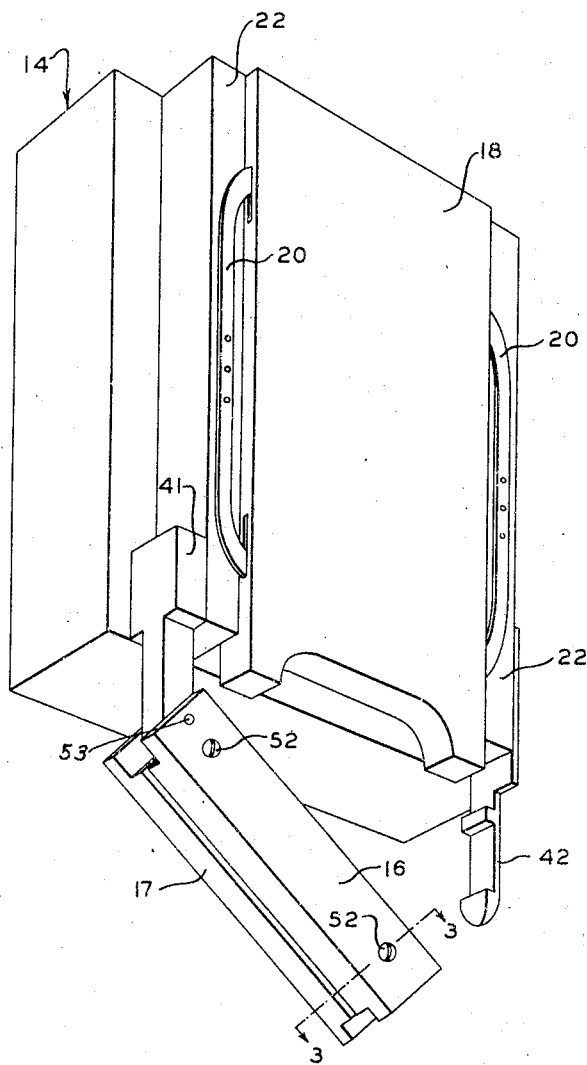
Figure 1 is a perspective view of the rear of the photographic apparatus of the present invention.

Copending application Serial No. 576,254, filed February 5, 1945, by Edwin H. Land for Photographic process, apparatus and product, now abandoned, discloses a method of processing a photosensitive layer by spreading a thin layer of a liquid containing one or more photographic reagents, or which is a solvent for a photographic reagent, between said photosensitive layer and a second layer of material.

Copending application Serial No. 790,064, filed December 6, 1947, by Edwin H. Land et al. for Photographic process and apparatus, discloses an apparatus for carrying out the process disclosed in application Serial No. 576,254, wherein the layer of liquid spread between the photosensitive layer, and the second layer of material is of a predetermined uniform thickness. It is desirable in carrying out the process disclosed in application Serial No. 576,254, that the layer of liquid, in addition to being a uniform predetermined thickness, also be of substantially uniform predetermined width and that width be at least slightly narrower than the width of the two layers of material so that none of the liquid will escape from between said layers.

The present invention provides a photographic apparatus capable of exposing a sheet of photosensitive material to actinic light, and spreading a liquid, between the surface of said photosensitive material and another layer of material, in a layer of uniform predetermined thickness having a uniform predetermined width. The sheet of photosensitive material may comprise any photosensitive material as, for example, silver halide. The other layer of sheetlike material preferably comprises a surface adapted to receive a visible positive image of a latent negative image contained in said photosensitive material. The liquid preferably is quite viscous and comprises a reagent which preferably contains a substance, or a solvent for a substance, capable of differentially reacting with portions of said exposed photosensitive material to create a visible effect therein and preferably capable of being transferred to said other layer of sheetlike material to form a visible positive image. The apparatus is simple, reliable, easy to operate, and results in a substantially uniform layer of liquid composition of predetermined desired thickness and width, regardless of the speed with which said composition is spread and/or the viscosity of said liquid composition.

One form of a camera apparatus embodying the present invention is shown somewhat diagrammatically in Figures 1 and 2. The camera disclosed in Figures 1 and 2 is basically similar to the type of camera employed to expose a conventional film pack or cut-film but is adapted to expose and process composite photographic film units of the type disclosed in copending application Serial No. 776,329, filed September 26, 1947, by Murry N. Fairbank, for Photographic product, and copending application Serial No. 776,326, filed September 26, 1947, by Otto E. Wolff, for Photographic product, and comprises a bellows 10, lens and shutter assembly 12, a back 14 and pressure-applying liquid-spreading members 16 and 17 carried by said back 14.

A pressure plate 18 is carried by the camera back 14 by means of spring members 20 which, in the embodiment disclosed, are mounted on guide members 22. The pressure plate 18 is adapted to move away from the camera back 14 to permit the insertion of a film holder 24 between said pressure plate 18 and the camera back 14 so that an exposure aperture 26 in said holder 24 is in alignment with exposure aperture 28 in the camera back 14. The film holder 24 is adapted to carry and hold in exposure position in the camera one of the composite photographic film units disclosed in the above-mentioned applications Serial Nos. 776,329 and 776,326. The composite photographic film units are explained in detail in the above-mentioned applications Serial Nos. 776,329 and 776,326 but essentially they comprise a sheet of photosensitive material 30, as for example, silver halide, and a liquid-carrying container 32, which are enclosed by an opaque envelope having front and rear walls 34 and 36, respectively. The opaque envelope may contain a second sheet of material 38 which is adapted to receive a visible positive image of any latent negative image which may be formed in said photosensitive layer 30, or a visible positive image may be formed directly on the inner surface of the envelope wall 34. One end of the photosensitive material 30 is held in a predetermined position in the film holder 24 by means of a pin 40 which passes through a hole in said photosensitive material 30. The film holder 24 is of such a length that when it is in position on the camera back 14 as disclosed in Fig. 2, an open end thereof extends a predetermined distance beyond one edge of said camera back. The composite film unit extends a predetermined distance out of the open end of the film holder 24.

A pair of novel pressure-applying liquid-spreading members 16 and 17 are hingedly mounted on the camera back 14 and are adapted to be pivoted into an operative position wherein they extend across and preferably enclose the open end of the film holder 24. The pressure-applying liquid-spreading members 16 and 17 make use of certain principles and proportions disclosed in the above-mentioned application Serial No. 790,064, and comprise two substantially rigid members adjustably mounted in spaced relation to each other so as to prevent, for all practical purposes, any movement toward or away from each other so that the space between them forms a fixed gap or slot having substantially the same width throughout its length. The members 16 and 17 are adjustably held in spaced relation to each other by means of adjusting screws 50 which are threadedly carried by the member 17 and which pass through said member 17 and engage a surface of the member 16, and screws 52 which pass through holes in said member 16 and are threadedly engaged by threaded openings 54 in the adjusting screws 50. It will thus be seen that the gap or slot between the members 16 and 17 may be adjusted to any predetermined width by screwing the adjusting screws 50 in or out to locate the member 16 with respect to the member 17 and holding the member 16 in the desired position by means of screws 52.

The pressure-applying liquid-spreading members 16 and 17 are hingedly mounted on the camera back 14 by means of a hinge arm 41 which may be attached to one of the guide members 22 by means of screws, rivets, or any other conventional fastening means. A spring catch 42 attached to the second guiding member 22 is adapted to releasably hold the pressure-applying liquid-spreading members 16 and 17 in operative position parallel to the adjacent edge of the camera back 14. The hinge arm 41 and spring catch 42 are of a predetermined length which permits the pressure-applying liquid-spreading members 16 and 17 to fit over the open end of the film holder 24 when in operative position.

The surfaces of the substantially rigid members 16 and 17 which form the fixed gap or slot comprise a substantially flat or planar portion 44 and a curved leading edge portion 46. The leading edge portions 46 cooperate with each other to form an entrance or pressure-generating throat in the slot or gap formed by the rigid members 16 and 17. In one satisfactory form of the present invention, the leading edges 46, when viewed in cross section, curve outwardly from the flat or planar portion 44 in the arc of a circle preferably having a radius of substantially 1/16 inch and the flat or planar portions 44 are spaced apart a predetermined distance which is substantially .003 inch greater than the total thickness of the two opaque envelope walls 34 and 36, the photosensitive material 30, and the second sheet of material 38. As thus far described, the rigid members 16 and 17 are substantially similar to the pressure-applying members disclosed in the above-mentioned copending application Serial No. 790,064. Each of the leading edge portions 46 terminates in a shoulder 48 and a flange 49. The leading edge portion 46 is substantially the same length as the desired width of the layer of liquid composition to be spread between the layer of photosensitive material 30 and the second layer of material 38. Inasmuch as it is desired that the edges of the layer of liquid composition fall inside the edges of both of said layers 30 and 38, the length of the leading edge portion 46 is less than the width of either of said layers 30 and 38. The leading edge portion 46 do not terminate abruptly, but merge at each end into a concave curve 58 having a radius of substantially 1/8 inch. This results in the flat or planar portions 44, which are parallel to each other when the rigid members 16 and 17 are in assembled relation, having a greater width at each end of each of the rigid members than they have at their central portions.

When a layer of photosensitive material and a second sheet of material having a supply of liquid composition located between their interface surfaces are advanced through the slot or gap formed by the pressure-applying liquid-spreading members 16 and 17, the pressure generating throat formed by the leading edge portions 46 causes a hydraulic pressure to be generated in said supply of liquid composition and said hydraulic pressure causes a predetermined quantity of said liquid composition to be forced through said slot or gap with each unit area of said two sheets of material, as is more particularly set forth in the above-mentioned application Serial No. 790,064. The concave 58 into which the leading edge portions 46 merge, and the wide end portions of the members 16 and 17, act as dams at each end of the pressure-generating throat and prevent the hydraulic pressure generated in the liquid composition from spreading said liquid composition longitudinally along said members 16 and 17 beyond said concave curves 58. Thus, by preventing the liquid composition from spreading longitudinally past the concave curves 58, the layer of liquid composition spread between the photosensitive material 30 and the second layer of material 38 is of uniform predetermined width and that width is less than the width of said two layers of material.

To expose and process one of the above-described composite photographic film units in the camera apparatus of the present invention, the pressure-applying liquid-spreading members 16 and 17 are released from the spring catch 42 and swung away from the camera back 14 on pivot pin 53. A film holder 24 carrying a composite photographic film unit is then inserted between the camera back 14 and the pressure plate 18, and the pressure-applying members 16 and 17 are pivoted back into operative position. When the members 16 and 17 are in operative position, the end of the composite photographic film unit projects through the fixed slot or gap formed by said members 16 and 17, and the open end of said film holder 24 is engaged and held by the shoulders 48 and flanges 49. The end of the opaque envelope which extends through the slot or gap, and past the end of the photosensitive material 30, is then grasped and the opaque envelope is pulled out of the film holder 24 until the photosensitive material located in back of the exposure apertures 26 and 28 is uncovered. The photosensitive layer is then exposed to actinic light by operating the lens and shutter assembly 12, and the opaque envelope is pushed back into the film holder 24 to again cover the photosensitive material 30, and to place the second sheet of material 38 in registration with the exposed area on the photosensitive material. The entire photographic film unit is then drawn out of the film holder 24 through the slot or gap formed by the members 16 and 17, by grasping the composite photographic film unit high enough so that the lower end of the sheet of photosensitive material is also grasped. The pressure-generating throat formed by the leading edges 46 causes a hydraulic pressure to be generated in the liquid composition carried by the liquid-carrying container 32. This hydraulic pressure causes the liquid-carrying container 32 to rupture and release said contained liquid whereupon the pressure-generating throat, upon continued movement of the composite photographic film unit through said slot or gap, causes said liquid to be spread in a uniform layer of predetermined thickness between said photo-sensitive material and the second sheet of material 38.

Whereas the camera apparatus disclosed in the drawing is one adapted to expose and process a single composite photographic film unit, it will be understood that the liquid-spreading pressure-applying means of the present invention can be employed in different types of camera apparatus. For example, the liquid-spreading pressure-applying means can be incorporated in a camera apparatus adapted to expose and process a roll of photosensitive material, or it can be incorporated in a camera apparatus adapted to sequentially expose and process a pack of composite photographic film units.

It will also be apparent to those skilled in the art that members 16 and 17 forming the slot or gap can be held a predetermined minimum distance apart by means of a spring strong enough to resist the pressure generated in the liquid both in rupturing the container 32 and in spreading the liquid between the sheetlike materials 30 and 38. Such a spring loading will permit the slot or gap to open to pass incompressible objects but remain fixed while spreading the liquid.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. A photographic apparatus comprising means for releasably positioning a multilayer photographic film unit in said photographic apparatus, said film unit having at least two layers of material one of which is a photosensitive layer, said means being so constructed that a predetermined image area on said photosensitive layer can be exposed to actinic light and said photosensitive layer and another of said layers of material can be drawn therefrom in face-to-face relation, two substantially parallel rigid members spaced from each other a predetermined distance and mounted against movement towards or away from each other, said parallel members being so positioned with respect to said means that said photosensitive layer and said other layer of material can be drawn therebetween in face-to-face relation, a portion of the space between said parallel members comprising a pressure-generating throat whereby a hydraulic pressure can be generated in a liquid located between said layers of material to cause said liquid to pass between said parallel members with said layers of material to form a layer having a substantially uniform predetermined thickness, said pressure-generating throat terminating in nonpressure-generating portions capable of preventing said liquid from spreading beyond the marginal edges of said layers of material.

2. A photographic apparatus comprising means for releasably positioning a layer of photosensitive material and another layer of material in said photographic apparatus, said means being so constructed that a predetermined image area on said photosensitive layer can be exposed to actininc light and said photosensitive layer and said other layer can be drawn therefrom in face-to-face relation, two substantially parallel rigid members spaced from each other a predetermined distance and mounted against movement towards or away from each other, said parallel members being hingedly mounted on said apparatus and so positioned thereon with respect to said means that they can be pivoted to a position wherein said photosensitive layer and said other layer can be drawn therebetween as they are drawn from said means, a portion of the space between said parallel members comprising a pressure-generating throat whereby a hydraulic pressure can be generated in a liquid located between said layers of material to cause said liquid to pass between said parallel members with said layers of material to form a layer having a substantially uniform predetermined thickness, said pressure-generating throat terminating in nonpressure-generating portions capable of preventing said liquid from spreading beyond the marginal edges of said layers of material.

3. A photographic apparatus comprising means for releasably positioning a film holder adapted to position a layer of photosensitive material and another layer of material in said photographic apparatus, said means being so constructed that a predetermined image area on said photosensitive layer can be exposed to actinic light and said photosensitive layer and said other layer can be drawn therefrom in face-to-face relation, two substantially parallel rigid members spaced from each other a predetermined distance and movably mounted on said apparatus exteriorly thereof, said parallel members being so positioned with respect to said means that said parallel members can be moved to a position wherein they embrace said film holder whereby said photosensitive layer and said other layer of material can be drawn between said parallel members in face-to-face relation, a portion of the space between said parallel members comprising a pressure-generating throat whereby a hydraulic pressure can be generated in a liquid located between said layers of material to cause said liquid to pass between said parallel members with said layers of material to form a layer having a substantially uniform predetermined thickness, said pressure-generating throat terminating in nonpressure-generating portions capable of preventing said liquid from spreading beyond the marginal edges of said layers of material.

4. A photographic apparatus comprising means for releasably positioning a film holder adapted to position a layer of photosensitive material and another layer of material in said photographic apparatus, said means being so constructed that a predetermined image area on said photosensitive layer can be exposed to actinic light and said photosensitive layer and said other layer can be drawn therefrom in face-to-face relation, two substantially parallel rigid members spaced from each other a predetermined distance and hingedly mounted on said apparatus exteriorly thereof, said parallel members being so positioned with respect to said means that said parallel members can be pivoted to a position wherein they embrace said film holder whereby said photosensitive layer and said other layer of material can be drawn between said parallel members in face-to-face relation, a portion of the space between said parallel members comprising a pressure-generating throat whereby a hydraulic pressure can be generated in a liquid located between said layers of material to cause said liquid to pass between said parallel members with said layers of material to form a layer having a substantially uniform predetermined thickness, said pressure-generating throat terminating in nonpressure-generating portions capable of preventing said liquid from spreading beyond the marginal edges of said layers of material.

5. A photographic apparatus comprising means for releasably positioning a sheet of photosensitive material comprising a photosensitive layer and another sheet material in said photographic apparatus, said means being so constructed that a predetermined image area on said photosensitive layer can be exposed to actinic light and said photosensitive sheet material and said other sheet material can be drawn therefrom in face-to-face relation, two substantially parallel rigid members spaced from each other a predetermined distance, said parallel members being so positioned with respect to said means that said photosensitive material and said other sheet material can be drawn therebetween as they are drawn from said means, a portion of the space between said parallel members comprising a pressure-generating throat whereby a hydraulic pressure can be generated in a liquid located between said layers of material to cause said liquid to pass between said parallel members with said layers of material to form a layer having a substantially uniform predetermined thickness, said pressure-generating throat terminating in nonpressure-generating portions capable of preventing said liquid from spreading beyond the marginal edges of said sheet material, said members being mounted so as to be held against movement towards or away from each other during the spreading of said liquid.

6. A photographic apparatus comprising means for releasably positioning a sheet of photosensitive material comprising a photosensitive layer and another sheet material in said photographic apparatus, said means being so constructed that a predetermined image area on said photosensitive layer can be exposed to actinic light and said photosensitive sheet material and said other sheet material can be drawn therefrom in face-to-face relation, two substantially parallel rigid members spaced from each other a predetermined distance, said parallel members being so positioned with respect to said means that said photosensitive material and said other sheet material can be drawn therebetween as they are drawn from said means, a portion of the space between said parallel members comprising a pressure-generating throat whereby a hydraulic pressure can be generated in a liquid located between said layers of material to cause said liquid to pass between said parallel members with said layers of material to form a layer having a substantially uniform predetermined thickness, said pressure-generating throat terminating in nonpressure-generating portions capable of preventing said liquid from spreading beyond the marginal edges of said sheet material, said members being mounted so as to be held against movement towards or away from each other during the spreading of said liquid, said nonpressure-generating portions having flat surfaces substantially parallel to one another and spaced apart a distance no greater than the minimum separation of said members.

7. A photographic apparatus comprising means for releasably positioning a sheet of photosensitive material comprising a photosensitive layer and another sheet material in said photographic apparatus, said means being so constructed that a predetermined image area on said photosensitive layer can be exposed to actinic light and said photosensitive sheet material and said other sheet material can be drawn therefrom in face-to-face relation, two substantially parallel rigid members spaced from each other a predetermined distance, said parallel members being so positioned with respect to said means that said photosensitive material and said other sheet material can be drawn therebetween as they are drawn from said means, a portion of the space between said parallel members comprising a pressure-generating throat whereby a hydraulic pressure can be generated in a liquid located between said layers of material to cause said liquid to pass between said parallel members with said layers of material to form a layer having a substantially uniform predetermined thickness, said pressure-generating throat terminating in non-pressure-generating portions capable of preventing said liquid from spreading beyond the marginal edges of said sheet material, said members being mounted so as to be held against movement towards or away from each other during the spreading of said liquid, said nonpressure-generating portions having flat surfaces substantially parallel to one another and spaced apart a distance no greater than the minimum separation of said members, said pressure-generating throat being located between said nonpressure-generating portions and curving away from said nonpressure-generating portions.

8. A photographic apparatus comprising means for releasably positioning a multilayer photographic film unit in said photographic apparatus, said film unit having at least two layers of material one of which is a photosensitive layer, said means being so constructed that a predetermined image area on said photosensitive layer can be exposed to actinic light and said photosensitive layer and another of said layers of material can be drawn therefrom in face-to-face relation, two substantially parallel rigid members spaced from each other a predetermined distance and mounted against movement towards or away from each other, said parallel members being so positioned with respect to said means that said photosensitive layer and said other layer of material can be drawn therebetween in face-to-face relation, a portion of the space between said parallel members comprising a pressure-generating throat whereby a hydraulic pressure can be generated in a liquid located between said layers of material to cause said liquid to pass between said parallel members with said layers of material to form a layer of uniform predetermined thickness.

9. A photographic apparatus comprising means for releasably positioning a layer of photosensitive material and other layer of material in said photographic apparatus, said means being so constructed that a predetermined image area on said photosensitive layer can be exposed to actinic light and said photosensitive layer and said other layer can be drawn therefrom in face-to-face relation, two substantially parallel rigid members spaced from each other a predetermined distance, said parallel members being hingedly mounted on said apparatus exteriorly thereof and so positioned thereon with respect to said means that they can be pivoted to a position wherein said photosensitive layer and said other layer can be drawn therebetween to spread a liquid between the interface surfaces of said layers as they are drawn from said means.

10. A photographic apparatus comprising means for releasably positioning a film holder adapted to position a multilayer photographic film unit in said photographic apparatus, said film unit having at least two layers of material one of which is a photosensitive layer, said film holder being so constructed that a predetermined image area on said photosensitive layer can be exposed to actinic light and said photosensitive layer and another of said layers of material can be drawn therefrom in face-to-face relation, two substantially parallel rigid members spaced from each other a predetermined distance and movably mounted on said apparatus exteriorly thereof, said parallel members being so positioned with respect to said means that they can be moved to a position wherein they embrace said film holder whereby said photosensitive layer and said other layer of material can be drawn between said parallel members in face-to-face relation, a portion of the space between said parallel members comprising a pressure-generating throat whereby a hydraulic pressure can be generated in a liquid located between said layers of material to cause said liquid to pass between said parallel members with said layers of material to form a layer of uniform predetermined thickness.

11. A photographic apparatus comprising means for releasably positioning a film holder adapted to position a multilayer photographic film unit in said photographic apparatus, said film unit having at least two layers of material one of which is a photosensitive layer, said film holder being so constructed that a predetermined image area on said photosensitive layer can be exposed to actinic light and said photosensitive layer and another of said layers of material can be drawn therefrom in face-to-face relation, two substantially parallel rigid members spaced from each other a predetermined distance and hingedly mounted on said apparatus exteriorly thereof, said parallel members being so positioned with respect to said means that said parallel members can be moved to a position wherein they embrace said film holder whereby said photosensitive layer and said other layer of material can be drawn between said parallel members in face-to-face relation, a portion of the space between said parallel members comprising a pressure-generating throat whereby a hydraulic pressure can be generated in a liquid located between said layers of material to cause said liquid to pass between said parallel members with said layers of material to form a layer of uniform predetermined thickness.

12. A photographic device comprising means providing an exposure chamber wherein a film unit comprising a photosensitive layer may be exposed, means forming an aperture in said chamber means through which said film unit may be inserted into and withdrawn from said chamber means, a pair of pressure-applying members, means for mounting said pair of pressure-applying members so that the latter may assume at least two different positions with respect to said chamber means, in one position thereof said members being located opposite said aperture in the path of withdrawal of said film unit from said chamber means whereby said unit may be withdrawn between said members to cause the spreading of a processing fluid releasably carried thereby throughout a predetermined portion thereof, and in the other position thereof said members being located away from said aperture to enable the unit to be inserted into said chamber without contacting said members.

13. A photographic apparatus comprising means for releasably positioning a layer of photosensitive material and another layer of material in said photographic apparatus, said means being so constructed that a predetermined image area on said photosensitive layer can be exposed to actinic light and said photosensitive layer and said other layer can be drawn therefrom in face-to-face relation, two substantially parallel rigid members spaced from each other a predetermined distance, mechanism for pivotally mounting said parallel rigid members exteriorly of said apparatus, said parallel members being so positioned with respect to said means that said photosensitive layer and said other layer of material can be drawn therebetween in face-to-face relation, a portion of the space between said parallel members comprising a pressure-generating throat whereby a hydraulic pressure can be generated in a liquid located between said layers of material to cause said liquid to pass between said parallel members with said layers of material to form a layer of uniform predetermined thickness, and means for keeping said rigid pressure-applying members in their spaced relation, said last-named means keeping said members from separating in response to the pressure generated in the formation of said layer of liquid.

14. A photographic apparatus comprising means for releasably positioning a layer of photosensitive material and another layer of material in said photographic apparatus, said means being so constructed that a predetermined image area on said photosensitive layer can be exposed to actinic light and said photosensitive layer and said other layer can be drawn therefrom in face-to-face relation, two substantially parallel rigid members spaced from each other a predetermined distance, said parallel members being located exteriorly of said apparatus and being so positioned with respect to said means that said photosensitive layer and said other layer of material can be drawn therebetween in face-to-face relation, a portion of the space between said parallel members comprising a pressure-generating throat whereby a hydraulic pressure can be generated in a liquid located between said layers of material to cause said liquid to pass between said parallel members with said layers of material to form a layer of uniform predetermined thickness, and means for keeping said rigid pressure-applying members in their spaced relation, said last-named means keeping said members from separating in response to the pressure generated in the formation of said layer of liquid.

15. A photographic apparatus comprising means for releasably positioning a layer of photosensitive material and another layer of material in said photographic apparatus, said means being so constructed that a predetermined image area on said photosensitive layer can be exposed to actinic light and said photosensitive layer and said other layer can be drawn therefrom in face-to-face relation, two substantially parallel rigid members spaced from each other a predetermined distance, said parallel members being so positioned with respect to said means that said photosensitive layer and said other layer of material can be drawn therebetween in face-to-face relation, a portion of the space between said parallel members comprising a pressure-generating throat whereby a hydraulic pressure can be generated in a liquid located between said layers of material to cause said liquid to pass between said parallel members with said layers of material to form a layer of uniform predetermined thickness, and means for attaching said rigid, pressure-applying members to said apparatus exteriorly thereof in the path of travel of said layers of material upon withdrawal of the latter from said first-named means.

16. A photographic apparatus comprising means for releasably positioning a layer of photosensitive material and another layer of material in said photographic apparatus, said means being so constructed that a predetermined image area on said photosensitive layer can be exposed to actinic light and said photosensitive layer and said other layer can be drawn therefrom in face-to-face relation, two substantially parallel rigid members spaced from each other a predetermined distance, said parallel members being so positioned with respect to said means that said photosensitive layer and said other layer of material can be drawn therebetween in face-to-face relation, a portion of the space between said parallel members comprising a pressure-generating throat whereby a hydraulic pressure can be generated in a liquid located between said layers of material to cause said liquid to pass between said parallel members with said layers of material to form a layer of uniform predetermined thickness, and means for attaching said rigid, pressure-applying members to said apparatus exteriorly thereof in the path of travel of said layers of material upon withdrawal of the latter from said first-named means, said attaching means so mounting said rigid pressure-applying members as to permit movement thereof from operative position to a position out of said path of travel of said materials.

17. A photographic apparatus comprising means for releasably positioning a film holder adapted to position a layer of photosensitive material and another layer of material in said photographic apparatus, said means being so constructed that a predetermined image area on said photosensitive layer can be exposed to actinic light and said photosensitive layer and said other layer can be drawn therefrom in face-to-face relation, two substantially parallel rigid members spaced from each other a predetermined distance and movably mounted on said apparatus exteriorly thereof, said parallel members being so positioned with respect to said means that they can be moved to a position wherein they embrace said film holder whereby said photosensitive layer and said other layer of material can be drawn between said parallel members in face-to-face relation, a portion of the space between said parallel members comprising a pressure-generating throat whereby a hydraulic pressure can be generated in a liquid located between said layers of material to cause said liquid to pass between said parallel members with said layers of material to form a layer of uniform predetermined thickness.

OTTO E. WOLFF.

No references cited.

Certificate of Correction

Patent No. 2,483,389                                                          October 4, 1949

OTTO E. WOLFF

It is hereby certified that errors appear in the printed specification of the above numbered patent requiring correction as follows:

Column 5, line 28, for the word "portion" read *portions*; line 51, for "concave 58" read *concave curves 58*; column 10, line 15, for "other" read *another*;

and that the said Letters Patent should be read with these corrections therein that the same may conform to the record of the case in the Patent Office.

Signed and sealed this 18th day of July, A. D. 1950.

[SEAL]

JOE E. DANIELS,
*Assistant Commissioner of Patents.*